United States Patent
Loster et al.

(10) Patent No.: US 12,363,099 B2
(45) Date of Patent: Jul. 15, 2025

(54) SECURING USER INTERFACES OF A COMPUTING CLUSTER

(71) Applicant: Bank of America Corporation, Charlotte, NC (US)

(72) Inventors: Leonard Anthony Loster, Arlington Heights, IL (US); Manikumar Juttukonda, Saint Augustine, FL (US)

(73) Assignee: Bank of America Corporation, Charlotte, NC (US)

( * ) Notice: Subject to any disclaimer, the term of this patent is extended or adjusted under 35 U.S.C. 154(b) by 354 days.

(21) Appl. No.: 18/165,067

(22) Filed: Feb. 6, 2023

(65) Prior Publication Data

US 2024/0267371 A1  Aug. 8, 2024

(51) Int. Cl.
 *H04L 9/40* (2022.01)

(52) U.S. Cl.
 CPC ........ *H04L 63/083* (2013.01); *H04L 63/0869* (2013.01)

(58) Field of Classification Search
 None
 See application file for complete search history.

(56) References Cited

U.S. PATENT DOCUMENTS

| | | | |
|---|---|---|---|
| 9,027,097 B2 * | 5/2015 | Bortz | H04L 63/0807 726/8 |
| 9,069,599 B2 | 6/2015 | Martinez et al. | |
| 9,172,608 B2 | 10/2015 | Zeyliger et al. | |
| 9,479,394 B2 | 10/2016 | Lochhead et al. | |
| 9,495,544 B2 | 11/2016 | Aissi et al. | |
| 10,154,037 B2 * | 12/2018 | Pattar | H04L 63/10 |
| 10,212,174 B2 | 2/2019 | Muddu et al. | |
| 10,298,555 B2 | 5/2019 | Murray | |
| 10,454,936 B2 * | 10/2019 | Koottayi | H04L 63/101 |
| 10,587,697 B2 * | 3/2020 | Drasin | H04L 67/141 |
| 10,671,751 B2 | 6/2020 | Schneider et al. | |
| 10,740,353 B2 | 8/2020 | Horowitz et al. | |
| 10,756,991 B2 | 8/2020 | Layman et al. | |
| 11,005,824 B2 | 5/2021 | Crabtree et al. | |
| 11,019,101 B2 | 5/2021 | Narayanaswamy et al. | |
| 11,303,627 B2 * | 4/2022 | Maria | H04L 63/0815 |
| 2018/0337914 A1 | 11/2018 | Mohamad Abdul et al. | |
| 2019/0215313 A1 | 7/2019 | Doshi et al. | |
| 2020/0028848 A1 * | 1/2020 | Gupta | G06F 21/105 |
| 2020/0358804 A1 | 11/2020 | Crabtree et al. | |
| 2020/0412754 A1 | 12/2020 | Crabtree et al. | |

(Continued)

*Primary Examiner* — Jeffrey R Swearingen

(57) ABSTRACT

A method includes receiving user credentials of a user from a user device. Access information for the user including a set of uniform resource locators (URLs) is received from a computing cluster. The set of URLs correspond to user interfaces (UIs) of the computing cluster accessible to the user. An authentication token is generated based on the user credentials and the access information. A first copy of the authentication token is assigned to a session variable of a browser application of the user device. A second copy of the authentication token is sent to the computing cluster. A first URL is inputted into the browser application to attempt accessing a first UI of the computing cluster. In response to the first URL being one of the set of URLs and the session variable matching the second copy of the authentication token, the first UI is accessed using the browser application.

20 Claims, 3 Drawing Sheets

(56) References Cited

U.S. PATENT DOCUMENTS

| | | | |
|---|---|---|---|
| 2021/0004454 A1* | 1/2021 | Chester | H04L 9/3213 |
| 2022/0131851 A1* | 4/2022 | Singh | H04L 67/02 |
| 2022/0166781 A1 | 5/2022 | Hittel et al. | |
| 2023/0198979 A1* | 6/2023 | Dimitrov | H04L 63/0815 |
| | | | 726/9 |

* cited by examiner

SECURING USER INTERFACES OF A COMPUTING CLUSTER

TECHNICAL FIELD

The present disclosure relates generally to securing a computing system, and more specifically to a system and method for securing user interfaces of a computing cluster.

BACKGROUND

A computing cluster may be configured to provide access to multiple users. In particular, each user may access a respective user interface on the computing cluster. In a large organization, maintaining secure access to user interfaces requires considerable computing resources to maintain all devices of the computing cluster and all user devices of the users in a Kerberos database. Accordingly, the user interfaces are usually accessed without providing secure authentication of the users.

SUMMARY

The system described in the present disclosure provides several practical applications and technical advantages that overcome the current technical problems with securing user interfaces of computing clusters.

In general, an authentication token generator receives user credentials of a user from a user device. The authentication token generator compares the received user credentials of the user to stored user credentials for the user. In response to determining that the received user credentials of the user match the stored user credentials of the user, the authentication token generator authenticates the user. The authentication token generator determines a group of the user based on the user credentials of the user. The authentication token generator sends the group of the user to a computing cluster.

The computing cluster determines access information for the user based on the group, where the access information comprises a set of uniform resource locators (URLs) associated with the group, and where each URL of the set of URLs corresponds to a respective user interface (UI) of the computing cluster that is accessible to the group. The authentication token generator receives the access information for the user from the computing cluster. The authentication token generator generates an authentication token based on the user credentials of the user and the access information. The authentication token generator sends a first copy of the authentication token to the user device of the user and a second copy of the authentication token to the computing cluster.

The user device assigns the first copy of the authentication token to a session variable of a browser application of the user device. The user device inputs a URL into the browser application to attempt accessing a respective UI of the computing cluster. The user device sends the URL and the session variable to the computing cluster. The computing cluster compares the session variable to the second copy of the authentication token.

In response to determining that the session variable matches the second copy of the authentication token, the computing cluster determines a time that passed from generating the authentication token by the authentication token generator. The computing cluster compares the time to an authentication token lifetime. In response to determining that the time is less than the authentication token lifetime, the computing cluster compares the URL to the set of URLs.

In response to determining that the URL is one of the set of URLs, the user device accesses the UI of the computing cluster using the browser application. In other words, in response to determining that the URL is one of the set of URLs, the computing cluster grants access to the user device.

By using authentication tokens, the user devices gain secure access to respective user interfaces of the computing cluster. In other words, authentication tokens secure the user interfaces of the computing cluster. By securing the user interfaces of the computing cluster, each user device is granted access to approved user interfaces and is denied access to other user interfaces. Accordingly, network security of the computing cluster is improved. Furthermore, by not maintaining all computing nodes of the computing cluster and all user devices of the users in a Kerberos database, computing resources (such as, for example, memory and network bandwidth) that would otherwise be utilized for securing user interfaces are saved. Accordingly, the following disclosure allows for securing user interfaces of computing clusters without utilizing considerable computing resources. In other words, by using authentication tokens to secure the user interfaces of the computing cluster, utilization of computing resources (such as, for example, memory and network bandwidth) is reduced.

Accordingly, the following disclosure is particularly integrated into practical applications of: (1) securing user interfaces of computing clusters using authentication tokens; and (1) reducing utilization of computing resources, while securing user interfaces of computing clusters using authentication tokens.

In one embodiment, a system includes an authentication token generator, the first user device communicatively coupled to the authentication token generator, and the computing cluster communicatively coupled to the first user device and the authentication token generator. The authentication token generator includes a first memory and a first processor communicatively coupled to the first memory. The first memory is configured to store a group associated with each user and user credentials for each user. The first processor is configured to receive first user credentials of a first user from a first user device. The first user credentials are compared to stored user credentials for the first user. In response to the first user credentials matching the stored user credentials for the first user, the first user is authenticated. A first group of the first user is determined based on the first user credentials. The first group is sent to a computing cluster. In response to sending the first group, first access information for the first user is received from the computing cluster. The first access information comprises a first set of uniform resource locators (URLs) associated with the first group. Rach URL of the first set of URLs corresponds to a respective user interface (UI) of the computing cluster that is accessible to the first group. A first authentication token is generated based on the first user credentials and the first access information. A first copy of the first authentication token is sent to the first user device. A second copy of the first authentication token is sent to the computing cluster. The first user device includes a second memory and a second processor communicatively coupled to the second memory. The second memory is configured to store a first browser application. The second processor is configured to receive the first copy of the first authentication token from the authentication token generator. The first copy of the first authentication token is assigned to a first session variable of the first browser application. A first URL is inputted into the first browser application to attempt accessing a first UI of the computing cluster. The first URL and the first session variable are sent to the computing cluster. The computing cluster includes a third memory and a third processor communicatively coupled to the third memory. The third memory is configured to store respective access information for each user. The third processor is configured to receive the second copy of the first authentication token from the authentication token generator. The first URL and the first session variable are received from the first user device. The first session variable is compared to the second copy of the first authentication token. In response to the first session variable matching the second copy of the first authentication token, the first URL is compared to the first set of URLs. The second processor is further configured to, in response to the first URL being one of the first set of URLs and the first session variable matching the second copy of the first authentication token, access the first UI of the computing cluster using the first browser application.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, where like reference numerals represent like parts.

DETAILED DESCRIPTION

Figure 1:
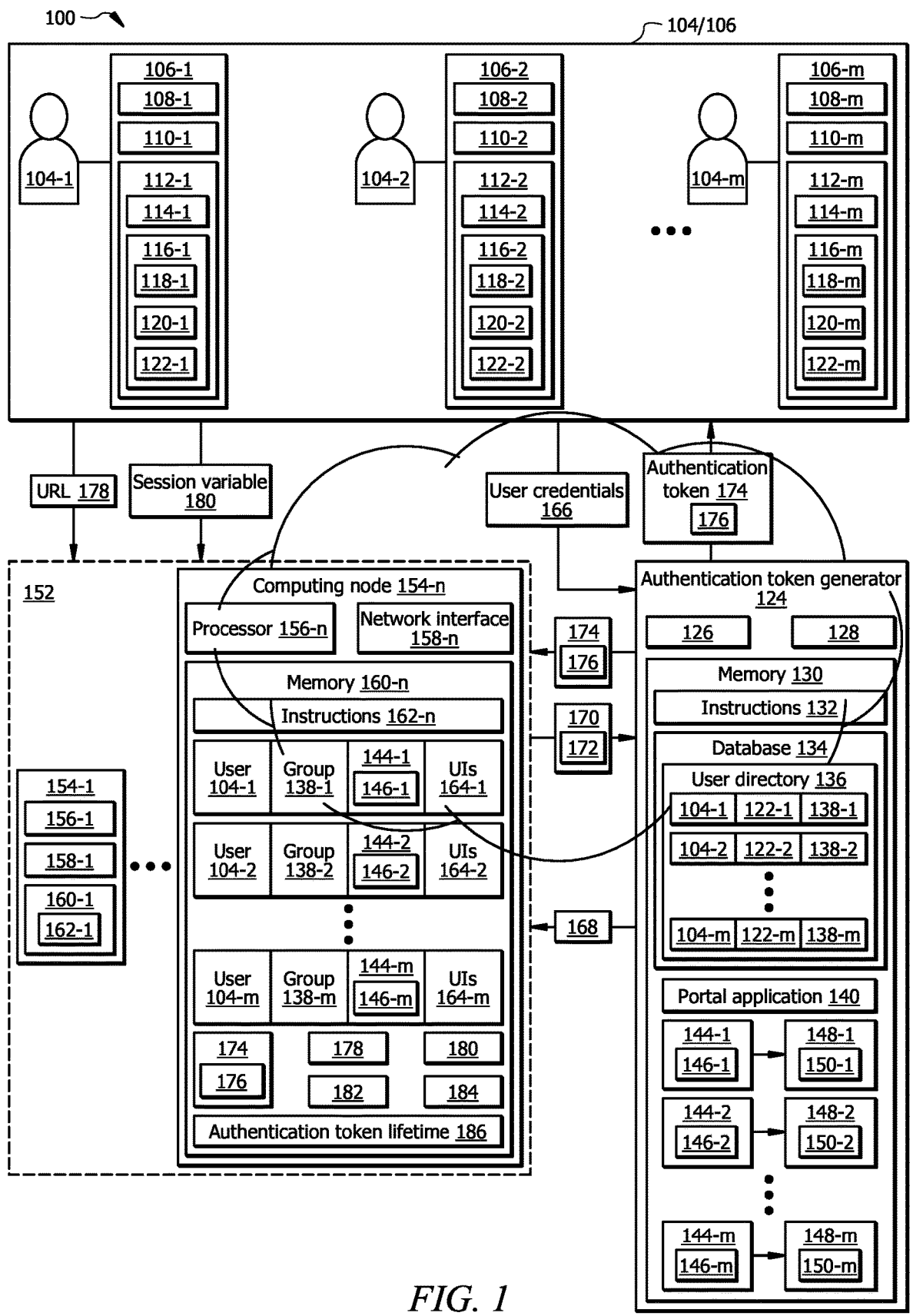
FIG. 1 illustrates an embodiment of a system configured to secure user interfaces of a computing cluster.
Figure 2A:
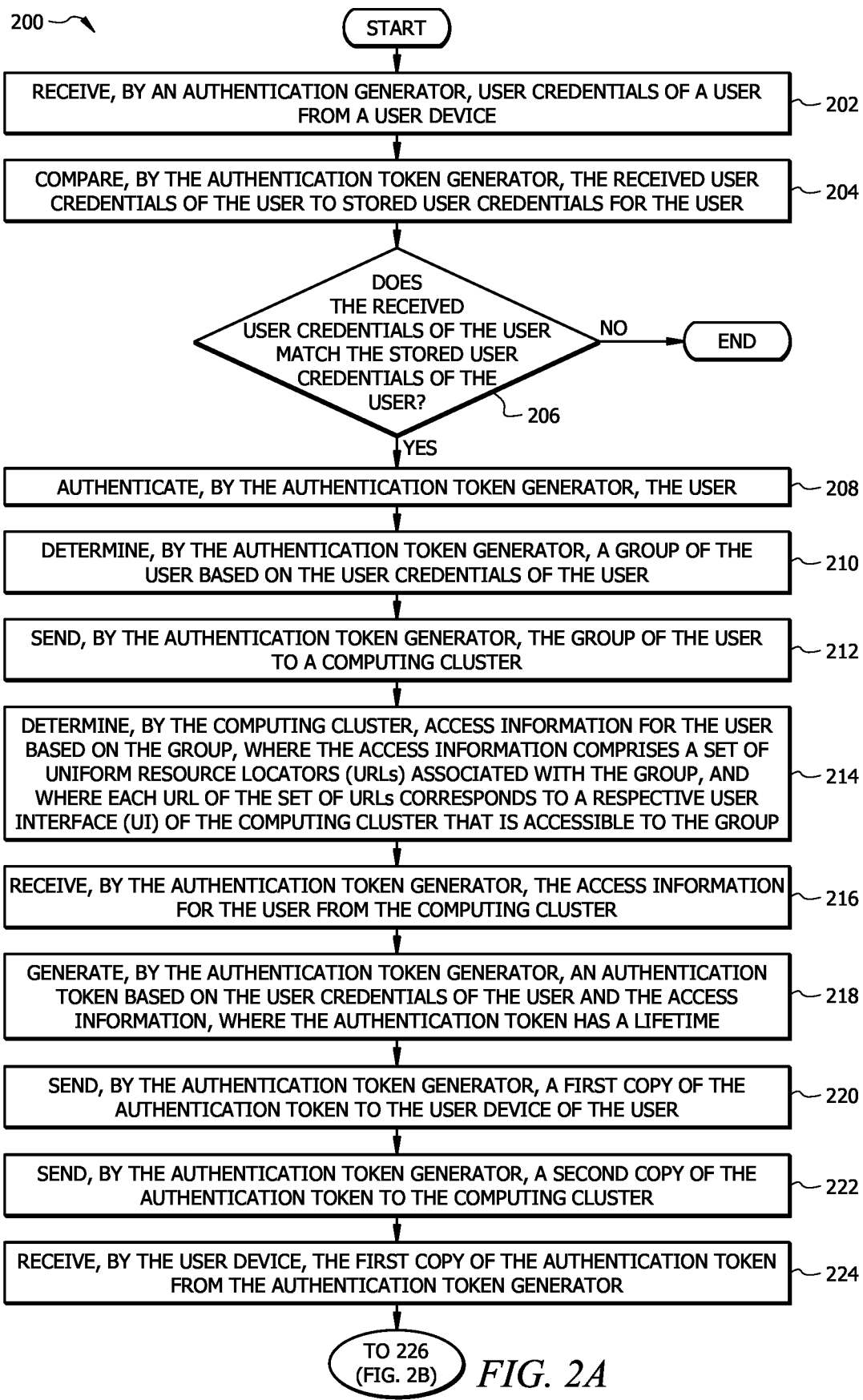
FIGS. 2A and 2B illustrate an example operational flow of system of FIG. 1 for securing user interfaces of a computing cluster.
Figure 2B:
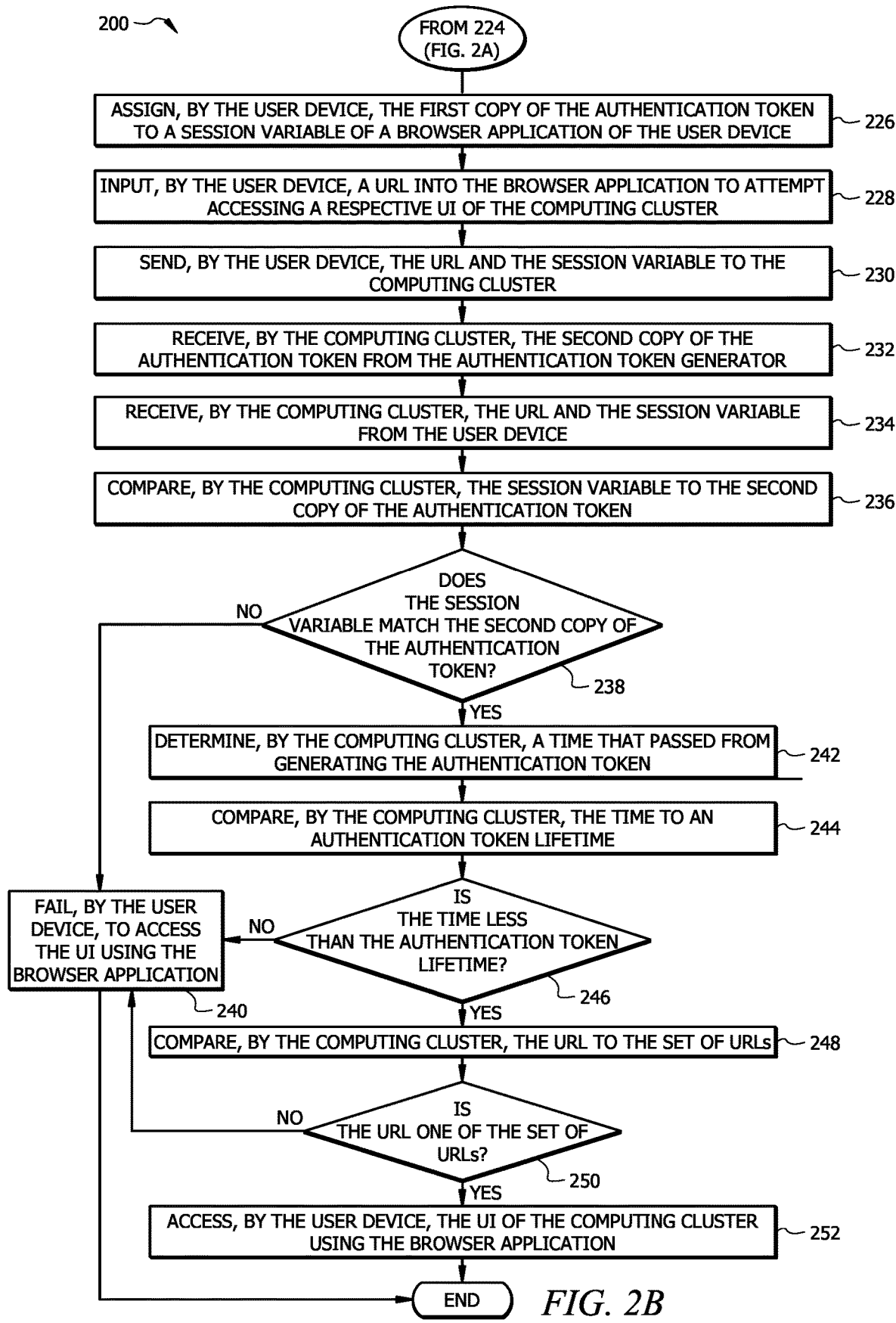

As described above, previous technologies fail to secure user interfaces of a computing cluster. Embodiments of the present disclosure and their advantages may be understood by referring to FIGS. 1, 2A, and 2B. FIGS. 1, 2A, and 2B are used to describe a system and method for securing user interfaces of a computing cluster.

System Overview

FIG. 1 illustrates an embodiment of a system 100 that is generally configured to secure user interfaces of a computing cluster 152. In certain embodiments, the system 100 comprises a plurality of user devices 106 (e.g., user devices 106-1 through 106-*m*) operably coupled to an authentication token generator 124 and the computing cluster 152 via a network 102. The computing cluster 152 may comprise a plurality of computing nodes 154-1 through 154-*n*. In an embodiment, the computing cluster 152 may be a Hadoop cluster. Network 102 enables the communication between the components of the system 100. In other embodiments, the system 100 may not have all the components listed and/or may have other elements instead of, or in addition to, those listed above.

In general, an authentication token generator 124 receives user credentials 166 of a user (e.g., respective one of users 104-1 through 104-*m*) from a user device. The authentication token generator 124 compares the received user credentials 166 of the user (e.g., respective one of users 104-1 through 104-*m*) to stored user credentials (e.g., respective one of user credentials 122-1 through 122-*m*) for the user (e.g., respective one of users 104-1 through 104-*m*). In response to determining that the received user credentials 166 of the user (e.g., respective one of users 104-1 through 104-*m*) match the stored user credentials (e.g., respective one of user credentials 122-1 through 122-*m*) of the user (e.g., respective one of users 104-1 through 104-*m*), the authentication token generator 124 authenticates the user (e.g., respective one of users 104-1 through 104-*m*). The authentication token generator 124 determines a group 168 of the user (e.g., respective one of users 104-1 through 104-*m*) based on the user credentials 166 of the user. The authentication token generator 124 sends the group 168 of the user (e.g., respective one of users 104-1 through 104-*m*) to a computing cluster 152.

The computing cluster 152 determines access information 170 for the user (e.g., respective one of users 104-1 through 104-*m*) based on the group 168, where the access information 170 comprises a set of uniform resource locators (URLs) 172 associated with the group 168, and where each URL of the set of URLs 172 corresponds to a respective user interface (UI) (e.g., respective one of the UIs 164-1 through 164-*m*) of the computing cluster 152 that is accessible to the group 168. The authentication token generator 124 receives the access information 170 for the user (e.g., respective one of users 104-1 through 104-*m*) from the computing cluster 152. The authentication token generator 124 generates an authentication token 174 based on the user credentials 168 of the user (e.g., respective one of users 104-1 through 104-*m*) and the access information 170. The authentication token generator 124 sends a first copy of the authentication token 174 to the user device (e.g., respective one of user devices 106-1 through 106-*m*) of the user (e.g., respective one of users 104-1 through 104-*m*) and a second copy of the authentication token 174 to the computing cluster 152.

The user device (e.g., respective one of user devices 106-1 through 106-*m*) assigns the first copy of the authentication token 174 to a session variable (e.g., respective one of session variables 120-1 through 120-*m*) of a browser application (e.g., respective one of browser applications 116-1 through 116-*m*) of the user device (e.g., respective one of user devices 106-1 through 106-*m*). The user device (e.g., respective one of user devices 106-1 through 106-*m*) inputs a URL (e.g., respective one of URLs 118-1 through 118-*m*) into the browser application (e.g., respective one of browser applications 116-1 through 116-*m*) to attempt accessing a respective UI (e.g., respective one of UIs 164-1 through 164-*m*) of the computing cluster 152. The user device (e.g., respective one of user devices 106-1 through 106-*m*) sends the URL 178 and the session variable 180 to the computing cluster 152. The computing cluster 152 compares the session variable 180 to the second copy of the authentication token 174.

In response to determining that the session variable 180 matches the second copy of the authentication token 174, the computing cluster 152 determines a time 184 that passed from generating the authentication token 174 by the authentication token generator 124. The computing cluster 152 compares the time 184 to an authentication token lifetime 186. In response to determining that the time 184 is less than the authentication token lifetime 186, the computing cluster 152 compares the URL 178 to the set of URLs (e.g., respective one of URLs 146-1 through 146-*m*). In response to determining that the URL 178 is one of the set of URLs (e.g., respective one of URLs 146-1 through 146-*m*), the user device (e.g., respective one of user devices 106-1 through 106-*m*) accesses the UI (e.g., respective one of UIs 164-1 through 164-*m*) of the computing cluster 152 using the browser application (e.g., respective one of browser applications 116-1 through 116-m). In other words, in response to determining that the URL 178 is one of the set of URLs 146-1 through 146-m), the computing cluster 152 grants access to the user device (e.g., respective one of user devices 106-1 through 106-m).

System Components

Network

Network 102 may be any suitable type of wireless and/or wired network. The network 102 may or may not be connected to the Internet or public network. The network 102 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMax, etc.), a long-term evolution (LTE) network, a universal mobile telecommunications system (UMTS) network, a peer-to-peer (P2P) network, a Bluetooth network, a near field communication (NFC) network, and/or any other suitable network. The network 102 may be configured to support any suitable type of communication protocol as would be appreciated by one of ordinary skill in the art.

User Devices

Each of the user devices 106 (e.g., user devices 106-1 through 106-m) is generally any device that is configured to process data and interact with a respective one of users 104 (e.g., users 104-1 through 104-m). Examples of a user device include, but are not limited to, a personal computer, a desktop computer, a workstation, a server, a laptop, a tablet computer, a mobile phone (such as a smartphone), etc. Each of the user devices 106 may include a user interface, such as a display, a microphone, keypad, or other appropriate terminal equipment usable by a respective one of the users 104-1 through 104-m.

Each of the user devices 106-1 through 106-m may comprise a respective one of processors 108-1 through 108-m in signal communication with a respective one of memories 112-1 through 112-m and a respective one of network interfaces 110-1 through 110-m. Each of the processors 108-1 through 108-m comprises one or more processors operably coupled to the memory 110. Each of the processors 108-1 through 108-m is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). Each of the processors 108-1 through 108-m may be a programmable logic device, a microcontroller, a microprocessor, or any suitable combination of the preceding. The one or more processors are configured to process data and may be implemented in hardware or software. For example, each of the processors 108-1 through 108-m may be 8-bit, 16-bit, 32-bit, 64-bit, or of any other suitable architecture. The one or more processors are configured to implement various software instructions to perform the operations described herein. For example, the one or more processors are configured to execute respective software instructions 114-1 through 114-m and perform one or more functions described herein.

Each of the network interfaces 110-1 through 110-m is configured to enable wired and/or wireless communications (e.g., via network 102). Each of the network interfaces 110-1 through 110-m is configured to communicate data between a respective one of the user devices 106-1 through 106-m and other components of the system 100. For example, each of the network interfaces 110-1 through 110-m may comprise a WIFI interface, a local area network (LAN) interface, a wide area network (WAN) interface, a modem, a switch, or a router. Each of the processors 108-1 through 108-m is configured to send and receive data using a respective one of the network interfaces 110-1 through 110-m. Each of the network interfaces 110-1 through 110-m may be configured to use any suitable type of communication protocol as would be appreciated by one of ordinary skill in the art.

Each of the memories 112-1 through 112-m may be volatile or non-volatile and may comprise a read-only memory (ROM), random-access memory (RAM), ternary content-addressable memory (TCAM), dynamic random-access memory (DRAM), and static random-access memory (SRAM). Each of the memories 112-1 through 112-m may be implemented using one or more disks, tape drives, solid-state drives, and/or the like. Each of the memories 112-1 through 112-m may store any of the information described in FIGS. 1, 2A, and 2B along with any other data, instructions, logic, rules, or code operable to implement the function(s) described herein when executed by a respective one of the processors 108-1 through 108-n. Each of the memories 112-1 through 112-m is operable to store a respective one of the software instructions 114-1 through 114-m, and/or any other data and instructions. Each of the software instructions 114-1 through 114-m may comprise any suitable set of software instructions, logic, rules, or code operable to be executed by a respective one the processors 108-1 through 108-n.

In certain embodiments, each of the memories 112-1 through 112-m further stores a respective one of browser applications 116-1 through 116-m. Each of the browser applications 116-1 through 116-m, when executed by a respective one of the processors 108-1 through 108-n, causes the respective one of the processors 108-1 through 108-n to perform operations described herein.

In operation, each of the user devices 106-1 through 106-m sends respective user credentials 166 to the authentication token generator 124. In embodiments when the user credentials 166 are sent by the user device 106-1, the user credentials 166 comprise user credentials 122-1, which may be sent to the authentication token generator 124 by inputting the user credentials 122-1 into the browser application 116-1. In embodiments when the user credentials 166 are sent by the user device 106-2, the user credentials 166 comprise user credentials 122-2, which may be sent to the authentication token generator 124 by inputting the user credentials 122-2 into the browser application 116-2. In embodiments when the user credentials 166 are sent by the user device 106-m, the user credentials 166 comprise user credentials 122-m, which may be sent to the authentication token generator 124 by inputting the user credentials 122-m into the browser application 116-m.

Each of the user devices 106-1 through 106-m receives a respective authentication token 174 from the authentication token generator 124. The authentication token 174 may comprise a timestamp 176, which encodes a time when the authentication token 174 was generated by the authentication token generator 124. In embodiments when the authentication token 174 is received by the user device 106-1, the authentication token 174 comprises an authentication token 148-1 and the timestamp 176 comprises a timestamp 150-1. In embodiments when the authentication token 174 is received by the user device 106-2, the authentication token 174 comprises an authentication token 148-2 and the timestamp 176 comprises a timestamp 150-2. In embodiments when the authentication token 174 is received by the user device 106-*m*, the authentication token 174 comprises an authentication token 148-*m* and the timestamp 176 comprises a timestamp 150-*m*.

Each of the user devices 106-1 through 106-*m* assigns the respective authentication token 174 to a respective session variable of a respective browser application. For example, the authentication token 148-1 received by the user device 106-1 is assigned to a session variable 120-1 of the browser application 116-1. The authentication token 148-2 received by the user device 106-2 is assigned to a session variable 120-2 of the browser application 116-2. The authentication token 148-*m* received by the user device 106-*m* is assigned to a session variable 120-*m* of the browser application 116-*m*.

Each of the user devices 106-1 through 106-*m* inputs a respective one of uniform resource locators (URLs) 118-1 through 118-*m* into a respective one of the browser applications 116-1 through 116-*m*. Each of the user devices 106-1 through 106-*m* sends a respective URL 178 and a respective session variable 180 to the computing cluster 152 via a respective browser application. For example, the user device 106-1 sends the URL 118-1 and the session variable 120-1 to the computing cluster 152. The user device 106-2 sends the URL 118-2 and the session variable 120-2 to the computing cluster 152. The user device 106-*m* sends the URL 118-*m* and the session variable 120-*m* to the computing cluster 152.

After the respective URL 178 and the respective session variable 180 are authenticated by the computing cluster 152, each of the user devices 106-1 through 106-*m* accesses a respective user interface (UI) of the computing cluster 152. For example, the user device 106-1 accesses a respective one of UIs 164-1 that corresponds to the URL 118-1. The user device 106-2 accesses a respective one of UIs 164-2 that corresponds to the URL 118-2. The user device 106-*m* accesses a respective one of UIs 164-*m* that corresponds to the URL 118-*m*. In certain embodiments, each of the users 104-1 through 104-*m* may access information on respective tasks performed by the computing cluster 152 via a respective one of the UIs 164-1 through 164-*m*.

Authentication Token Generator

The authentication token generator 124 is generally any device that is configured to process data and communicate with other components of the system 100 via the network 102. The authentication token generator 124 may comprise a processor 126 in signal communication with a memory 130 and a network interface 128.

Processor 126 comprises one or more processors operably coupled to the memory 130. The processor 126 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 126 may be a programmable logic device, a microcontroller, a microprocessor, or any suitable combination of the preceding. The one or more processors are configured to process data and may be implemented in hardware or software. For example, the processor 126 may be 8-bit, 16-bit, 32-bit, 64-bit, or of any other suitable architecture. The one or more processors are configured to implement various software instructions to perform the operations described herein. For example, the one or more processors are configured to execute software instructions 132 and perform one or more functions described herein.

Network interface 128 is configured to enable wired and/or wireless communications (e.g., via network 102). The network interface 128 is configured to communicate data between the authentication token generator 124 and other components of the system 100. For example, the network interface 128 may comprise a WIFI interface, a local area network (LAN) interface, a wide area network (WAN) interface, a modem, a switch, or a router. The processor 126 is configured to send and receive data using the network interface 128. The network interface 128 may be configured to use any suitable type of communication protocol as would be appreciated by one of ordinary skill in the art.

Memory 130 may be volatile or non-volatile and may comprise a read-only memory (ROM), random-access memory (RAM), ternary content-addressable memory (TCAM), dynamic random-access memory (DRAM), and static random-access memory (SRAM). Memory 130 may be implemented using one or more disks, tape drives, solid-state drives, and/or the like. The memory 130 may store any of the information described in FIGS. 1, 2A, and 2B along with any other data, instructions, logic, rules, or code operable to implement the function(s) described herein. The memory 130 is operable to store software instructions 132, and/or any other data and instructions. The software instructions 132 may comprise any suitable set of software instructions, logic, rules, or code operable to be executed by the processor 126.

Memory 130 may further store a database 134, which includes a user directory 136. The user directory 136 comprises information for each of the users 104-1 through 104-*m*. In certain embodiments, the user directory 136 comprises user credentials 122-1 through 122-1 and groups 138-1 through 138-*m* for the users 104-1 through 104-*m*, respectively. In certain embodiments, the user 104-1 and the user 104-2 may belong to different groups. In such embodiments, the group 138-1 is different from the group 138-2. In certain embodiments, the user 104-1 and the user 104-*m* may belong to a same group. In such embodiments, the group 138-1 is same as the group 138-*m*.

Memory 130 may further store a portal application 140. The portal application 140, when executed by the processor 126, causes the processor 126 to provide a portal for the user devices 106-1 through 106-*m*, which can be accessed by the browser applications 116-1 through 116-*m*, respectively.

In operation, the authentication token generator 124 receives the user credentials 166 from a respective one of the user devices 106-1 through 106-*m*. In embodiments when the user credentials 166 are received from the user device 106-1, the user credentials 166 comprise user credentials 122-1. In embodiments when the user credentials 166 are received from the user device 106-2, the user credentials 166 comprise user credentials 122-2. In embodiments when the user credentials 166 are received from the user device 106-*m*, the user credentials 166 comprise user credentials 122-*m*. In certain embodiments, the user credentials 122-1 through 122-*m* are received via the portal application 140, which is accessed by the browser applications 116-1 through 116-*m* of the user devices 106-1 through 106-*m*, respectively.

The authentication token generator 124 compares the user credentials 166 received from a respective one of the user devices 106-1 through 106-*m* to the user credentials 122-1 through 122-*m* that are stored in the user directory 136 of the authentication token generator 124. In response to the user credentials 166 received from the respective one of the user devices 106-1 through 106-*m* matching one of the user credentials 122-1 through 122-*m* stored in the user directory 136, the authentication token generator 124 authenticates a respective one of the users 104-1 through 104-*m* and determine a group to which the respective one of the users 104-1 through 104-*m* belongs. In embodiments when the user credentials 166 comprises the user credentials 122-1 of the user 104-1, the authentication token generator 124 authenticates the user 104-1 and determines a respective group 138-1. In embodiments when the user credentials 166 comprises the user credentials 122-2 of the user 104-2, the authentication token generator 124 authenticates the user 104-2 and determines a respective group 138-2. In embodiments when the user credentials 166 comprises the user credentials 122-*m* of the user 104-*m*, the authentication token generator 124 authenticates the user 104-*m* and determines a respective group 138-*m*.

The authentication token generator 124 sends a group 168 of a respective one of the users 104-1 through 104-*m* to the computing cluster 152. In embodiments when the authentication token generator 124 sends the group 168 of the user 104-1 to the computing cluster 152, the group 168 comprises the group 138-1. In embodiments when the authentication token generator 124 sends the group 168 of the user 104-2 to the computing cluster 152, the group 168 comprises the group 138-2. In embodiments when the authentication token generator 124 sends the group 168 of the user 104-*m* to the computing cluster 152, the group 168 comprises the group 138-*m*.

The authentication token generator 124 receives access information 170 of a respective one of the users 104-1 through 104-*m* from the computing cluster 152. The access information 170 comprises URLs 170 to which the respective one of the users 104-1 through 104-*m* has access. In embodiments when the authentication token generator 124 receives the access information 170 for the user 104-1, the access information 170 comprises access information 144-1 and the URLs 172 comprise URLs 146-1. In embodiments when the authentication token generator 124 receives the access information 170 for the user 104-2, the access information 170 comprises access information 144-2 and the URLs 172 comprise URLs 146-2. In embodiments when the authentication token generator 124 receives the access information 170 for the user 104-*m*, the access information 170 comprises access information 144-*m* and the URLs 172 comprise URLs 146-*m*.

The authentication token generator 124 generates authentication tokens 148-1 through 148-*m* from the access information 144-1 through 144-*m* and the user credentials 122-1 through 122-*m*, respectively. The authentication tokens 148-1 through 148-*m* comprise timestamps 150-1 through 150-*m*, respectively, which encode times when the authentication tokens 148-1 through 148-*m* were generated by the authentication token generator 124.

The authentication token generator 124 sends the authentication token 174 of a respective one of the users 104-1 through 104-*m* to the computing cluster 152. The authentication token 174 may comprise a timestamp 176, which encodes a time when the authentication token 174 was generated by the authentication token generator 124. In embodiments when authentication token generator 124 sends the authentication token 174 of the user 104-1 to the computing cluster 152, the authentication token 174 comprises the authentication token 148-1 and the timestamp 176 comprises the timestamp 150-1. In embodiments when authentication token generator 124 sends the authentication token 174 of the user 104-2 to the computing cluster 152, the authentication token 174 comprises the authentication token 148-2 and the timestamp 176 comprises the timestamp 150-2. In embodiments when authentication token generator 124 sends the authentication token 174 of the user 104-*m* to the computing cluster 152, the authentication token 174 comprises the authentication token 148-*m* and the timestamp 176 comprises the timestamp 150-*m*.

Computing Cluster

The computing cluster 152 comprises computing nodes 154-1 through 154-*n*. Each of the computing nodes 154-1 through 154-*n* is generally any device that is configured to process data and interact with other components of the system 100 via the network 102. Each of the computing nodes 154-1 through 154-*n* comprises a respective one of the processors 156-1 through 156-*n* in signal communication with a respective one of the memories 160-1 through 160-*n* and a respective one of network interfaces 158-1 through 158-*n*.

Each of the processors 156-1 through 156-*n* comprises one or more processors operably coupled to a respective one of the memories 160-1 through 160-*n*. Each of the processors 156-1 through 156-*n* is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). Each of the processors 156-1 through 156-*n* may be a programmable logic device, a microcontroller, a microprocessor, or any suitable combination of the preceding. The one or more processors are configured to process data and may be implemented in hardware or software. For example, each of the processors 156-1 through 156-*n* may be 8-bit, 16-bit, 32-bit, 64-bit, or of any other suitable architecture. The one or more processors are configured to implement various software instructions to perform the operations described herein. For example, the one or more processors are configured to execute a respective one of software instructions 162-1 through 162-*n* and perform one or more functions described herein.

Each of the network interfaces 158-1 through 158-*n* is configured to enable wired and/or wireless communications (e.g., via network 102). Each of the network interfaces 158-1 through 158-*n* is configured to communicate data between a respective one of the computing nodes 154-1 through 154-*n* and other components of the system 100. For example, each of the network interfaces 158-1 through 158-*n* may comprise a WIFI interface, a local area network (LAN) interface, a wide area network (WAN) interface, a modem, a switch, or a router. Each of the processors 156-1 through 156-*n* is configured to send and receive data using a respective one of the network interfaces 158-1 through 158-*n*. Each of the network interfaces 158-1 through 158-*n* may be configured to use any suitable type of communication protocol as would be appreciated by one of ordinary skill in the art.

Each of the memories 160-1 through 160-*n* may be volatile or non-volatile and may comprise a read-only memory (ROM), random-access memory (RAM), ternary content-addressable memory (TCAM), dynamic random-access memory (DRAM), and static random-access memory (SRAM). Each of the memories 160-1 through 160-*n* may be implemented using one or more disks, tape drives, solid-state drives, and/or the like. Each of the memories 160-1 through 160-*n* may store any of the information described in FIGS. 1, 2A, and 2B along with any other data, instructions, logic, rules, or code operable to implement the function(s) described herein when executed by a respective one of the processors 156-1 through 156-*n*. Each of the memories 160-1 through 160-*n* is operable to store a respective one of software instructions 162-1 through 162-*n*, and/or any other data and instructions. Each of the software instructions 162-1 through 162-*n* may comprise any suitable set of software instructions, logic, rules, or code operable to be executed by a respective one of the processors 156-1 through 156-*n*.

The computing cluster 152 may further store various parameters and data that are used by the computing cluster 152 during operation. For example, the memory 160-*n* of the computing node 154-*n* may store the groups 138-1 through 138-*m* and the access information 144-1 through 144-*m* for the users 104-1 through 104-*m*, respectively. The access information 144-1 through 144-*m* comprise the URLs 146-1 through 146-*m* to which the users 104-1 through 104-*m* have access. The memory 160-*n* may further store user interfaces (UIs) 164-1 through 164-*m*, which correspond to the URLs 146-1 through 146-*m*, respectively. The memory 160-*n* may further store an authentication token lifetime 186.

In embodiments when the group 138-1 is different from the group 138-2, the URLs 146-1 and the UIs 164-1 are different from the URLs 146-1 and the UIs 164-1, respectively. In embodiments when the group 138-1 is same as the group 138-*m*, the URLs 146-1 and the UIs 164-1 are same as the URLs 146-*m* and the UIs 164-*m*, respectively.

In operation, the computing cluster 152 receives a group 168 of a respective one of the users 104-1 through 104-*m* from the authentication token generator 124. In embodiments when the computing cluster 152 receives the group 168 of the user 104-1, the group 168 comprises the group 138-1. In embodiments when the computing cluster 152 receives the group 168 of the user 104-2, the group 168 comprises the group 138-2. In embodiments when the computing cluster 152 receives the group 168 of the user 104-*m*, the group 168 comprises the group 138-*m*.

The computing cluster 152 compares the group 168 to the groups 138-1 through 138-*m* stored in the memory 160-*n* of the computing node 154-*n*. In response to the group 168 matching one of the groups 138-1 through 138-*m*, the computing cluster 152 sends access information 170 of a respective one of the users 104-1 through 104-*m* to the authentication token generator 124. The access information 170 comprises URLs 172 to which the respective one of the users 104-1 through 104-*m* has access. In embodiments when the group 168 comprises the group 138-1 of the user 104-1, the access information 170 comprises the access information 144-1 and the URLs 172 comprise URLs 146-1. In embodiments when the group 168 comprises the group 138-2 of the user 104-2, the access information 170 comprises the access information 144-2 and the URLs 172 comprise URLs 146-2. In embodiments when the group 168 comprises the group 138-*m* of the user 104-*m*, the access information 170 comprises the access information 144-*m* and the URLs 172 comprise URLs 146-*m*.

The computing cluster 152 receives an authentication token 174 of a respective one of the users 104-1 through 104-*m* from the authentication token generator 124. The authentication token 174 comprises a timestamp 176, which encodes a time when the authentication token 174 was generated by the authentication token generator 124. In embodiments when the computing cluster 152 receives the authentication token 174 of the user 104-1 from the authentication token generator 124, the authentication token 174 comprises the authentication token 148-1 and the timestamp 176 comprises the timestamp 150-1. In embodiments when the computing cluster 152 receives the authentication token 174 of the user 104-2 from the authentication token generator 124, the authentication token 174 comprises the authentication token 148-2 and the timestamp 176 comprises the timestamp 150-2. In embodiments when the computing cluster 152 receives the authentication token 174 of the user 104-*m* from the authentication token generator 124, the authentication token 174 comprises the authentication token 148-*m* and the timestamp 176 comprises the timestamp 150-*m*.

The computing cluster 152 further receives the URL 178 and the session variable 180 from a respective one of the browser applications 116-1 through 116-*m* of a respective one of the user devices 106-1 through 106-*m*. In embodiments when the URL 178 and the session variable 180 are received form the user device 106-1, the URL 178 comprises URL 118-1 and the session variable 180 comprises the session variable 120-1. In embodiments when the URL 178 and the session variable 180 are received form the user device 106-2, the URL 178 comprises URL 118-2 and the session variable 180 comprises the session variable 120-2. In embodiments when the URL 178 and the session variable 180 are received form the user device 106-*m*, the URL 178 comprises URL 118-*m* and the session variable 180 comprises the session variable 120-*m*.

The computing cluster 152 compares the session variable 180 to the authentication token 174 stored in the memory 160-*n* of the computing node 154-*n*. In response to determining that the session variable 180 does not match the authentication token 174 stored in the memory 160-*n* of the computing node 154-*n*, the computing cluster 152 denies access to a respective one of the user devices 106-1 through 106-*m*.

In response to determining that the session variable 180 matches the authentication token 174 stored in the memory 160-*n* of the computing node 154-*n*, the computing cluster 152 determines a time 184 that passed from generating the authentication token 174 by the authentication token generator 124. In certain embodiments, the computing cluster 152 generates a timestamp 182 that encodes a time when the session variable 180 was received by the computing cluster 152 and determines the time 184 by subtracting the time encoded by the timestamp 176 from the time encoded by the timestamp 182.

Subsequently, the computing cluster 152 compares the time 184 to the authentication token lifetime 186. In response to determining that the time 184 is not less than the authentication token lifetime 186, the computing cluster 152 denies access to a respective one of the user devices 106-1 through 106-*m*.

In response to determining that the time 184 is less than the authentication token lifetime 186, the computing cluster 152 compares the URL 178 to the set of URLs to which a respective one of the users 104-1 through 104-*m* has access. In embodiments when URL 178 comprises the URL 118-1 that is received from the user 104-1 that belongs to the group 138-1, the computing cluster 152 compares the URL 118-1 to the URLs 146-1. In embodiments when URL 178 comprises the URL 118-2 that is received from the user 104-2 that belongs to the group 138-2, the computing cluster 152 compares the URL 118-2 to the URLs 146-2. In embodiments when URL 178 comprises the URL 118-*m* that is received from the user 104-*m* that belongs to the group 138-*m*, the computing cluster 152 compares the URL 118-*m* to the URLs 146-*m*.

In response to determining that the URL 178 is not one of the set of URLs to which a respective one of the users 104-1 through 104-*m* has access, the computing cluster 152 denies access to a respective one of the user devices 106-1 through 106-*m*.

In response to determining that the URL 178 is one of the set of URLs to which a respective one of the users 104-1 through 104-*m* has access, the computing cluster 152 grants access to a respective one of the user devices 106-1 through 106-*m*.

Example Method for Securing User Interfaces of a Computing Cluster

FIGS. 2A and 2B illustrate an example flowchart of a method 200 for securing user interfaces of a computing cluster. Modifications, additions, or omissions may be made to method 200. Method 200 may include more, fewer, or other operations. For example, operations may be performed in parallel or in any suitable order. For example, one or more operations of method 200 may be implemented, at least in part, in the form of the software instructions (e.g., instructions 114-1 through 114-*m*, 132, and/or 162-1 through 162-*n* of FIG. 1), stored on non-transitory, tangible, machine-readable medium (e.g., memories 112-1 through 112-*m*, 130, and/or 160-1 through 160-*n* of FIG. 1) that when executed by one or more processors (e.g., processors 108-1 through 108-*m*, 126, and/or 156-1 through 156-*n* of FIG. 1) may cause the one or more processors to perform operations 202-252.

At operation 202, an authentication token generator 124 receives user credentials 166 of a user (e.g., respective one of users 104-1 through 104-*m* of FIG. 1) from a user device (e.g., respective one of user devices 106-1 through 106-*m* of FIG. 1).

At operation 204, the authentication token generator 124 compares the received user credentials 166 of the user (e.g., respective one of users 104-1 through 104-*m* of FIG. 1) to stored user credentials (e.g., respective one of user credentials 122-1 through 122-*m* of FIG. 1) for the user (e.g., respective one of users 104-1 through 104-*m* of FIG. 1).

At operation 206, the authentication token generator 124 determines if the received user credentials 166 of the user (e.g., respective one of users 104-1 through 104-*m* of FIG. 1) match the stored user credentials (e.g., respective one of user credentials 122-1 through 122-*m* of FIG. 1) of the user (e.g., respective one of users 104-1 through 104-*m* of FIG. 1).

In response to determining at operation 206 that the received user credentials 166 of the user (e.g., respective one of users 104-1 through 104-*m* of FIG. 1) do not match the stored user credentials (e.g., respective one of user credentials 122-1 through 122-*m* of FIG. 1) of the user (e.g., respective one of users 104-1 through 104-*m* of FIG. 1), the user (e.g., respective one of users 104-1 through 104-*m* of FIG. 1) is not authenticated by the authentication token generator 124 and method 200 ends.

In response to determining at operation 206 that the received user credentials 166 of the user (e.g., respective one of users 104-1 through 104-*m* of FIG. 1) match the stored user credentials (e.g., respective one of user credentials 122-1 through 122-*m* of FIG. 1) of the user (e.g., respective one of the users 104-1 through 104-*m* of FIG. 1), method 200 continues to operation 208, where the authentication token generator 124 authenticates the user (e.g., respective one of users 104-1 through 104-*m* of FIG. 1).

At operation 210, the authentication token generator 124 determines a group 168 of the user (e.g., respective one of users 104-1 through 104-*m* of FIG. 1) based on the user credentials 166 of the user (e.g., respective one of users 104-1 through 104-*m* of FIG. 1).

At operation 212, by the authentication token generator 124 sends the group 168 of the user (e.g., respective one of users 104-1 through 104-*m* of FIG. 1) to a computing cluster 152.

At operation 214, the computing cluster 152 determine access information 170 for the user (e.g., respective one of users 104-1 through 104-*m* of FIG. 1) based on the group 168, where the access information 170 comprises a set of uniform resource locators (URLs) 172 associated with the group 168, and where each URL of the set of URLs 172 corresponds to a respective user interface (UI) (e.g., respective one of UIs 164-1 through 164-*m* of FIG. 1) of the computing cluster 152 that is accessible to the group 168.

At operation 216, the authentication token generator 124 receives the access information 170 for the user (e.g., respective one of users 104-1 through 104-*m* of FIG. 1) from the computing cluster 152.

At operation 218, the authentication token generator 124 generates an authentication token 174 based on the user credentials 168 of the user (e.g., respective one of users 104-1 through 104-*m* of FIG. 1) and the access information 170.

At operation 220, the authentication token generator 124 sends a first copy of the authentication token 174 to the user device (e.g., respective one of user devices 106-1 through 106-*m* of FIG. 1) of the user (e.g., respective one of users 104-1 through 104-*m* of FIG. 1).

At operation 222, the authentication token generator 124 sends a second copy of the authentication token 174 to the computing cluster 152.

At operation 224, the user device (e.g., respective one of user devices 106-1 through 106-*m* of FIG. 1) receives the first copy of the authentication token 174 from the authentication token generator 124.

At operation 226, the user device (e.g., respective one of devices 106-1 through 106-*m* of FIG. 1) assigns the first copy of the authentication token 174 to a session variable (e.g., respective one of session variables 120-1 through 120-*m* of FIG. 1) of a browser application (e.g., respective one of browser applications 116-1 through 116-*m* of FIG. 1) of the user device (e.g., respective one of devices 106-1 through 106-*m* of FIG. 1).

At operation 228, the user device (e.g., respective one of user devices 106-1 through 106-*m* of FIG. 1) inputs a URL (e.g., respective one of URLs 118-1 through 118-*m* of FIG. 1) into the browser application (e.g., respective one of browser applications 116-1 through 116-*m* of FIG. 1) to attempt accessing a respective UI (e.g., respective one of UIs 164-1 through 164-*m* of FIG. 1) of the computing cluster 152.

At operation 230, the user device (e.g., respective one of user devices 106-1 through 106-*m* of FIG. 1) sends the URL 178 and the session variable 180 to the computing cluster 152.

At operation 232, the computing cluster 152 receives the second copy of the authentication token 174 from the authentication token generator 124.

At operation 234, the computing cluster 152 receives the URL 178 and the session variable 180 from the user device (e.g., respective one of user devices 106-1 through 106-*m* of FIG. 1).

At operation 236, the computing cluster 152 compares the session variable 180 to the second copy of the authentication token 174.

At operation 238, the computing cluster 152 determines if the session variable 180 matches the second copy of the authentication token 174.

In response to determining at operation 238 that the session variable 180 does not match the second copy of the authentication token 174, method 200 continues to operation 240, where the user device (e.g., respective one of user devices 106-1 through 106-m of FIG. 1) fails to access the UI (e.g., respective one of UIs 164-1 through 164-m of FIG. 1) using the browser application (e.g., respective one of browser applications 116-1 through 116-m of FIG. 1). In other words, in response to determining at operation 238 that the session variable 180 does not match the second copy of the authentication token 174, the computing cluster 152 denies access to the user device (e.g., respective one of user devices 106-1 through 106-m of FIG. 1). After operation 240, method 200 ends.

In response to determining at operation 238 that the session variable 180 matches the second copy of the authentication token 174, method 200 continues to operation 242, where the computing cluster 152 determines a time 184 that passed from generating the authentication token 174 by the authentication token generator 124.

At operation 244, the computing cluster 152 compares the time 184 to an authentication token lifetime 186.

At operation 246, the computing cluster 152 determines if the time 184 is less than the authentication token lifetime 186.

In response to determining at operation 246 that the time 184 is not less than the authentication token lifetime 186, method 200 continues to operation 240, where the user device (e.g., respective one of user devices 106-1 through 106-m of FIG. 1) fails to access the UI (e.g., respective one of UIs 164-1 through 164-m of FIG. 1) using the browser application (e.g., respective one of browser applications 116-1 through 116-m of FIG. 1). In other words, in response to determining at operation 246 that the time 184 is not less than the authentication token lifetime 186, the computing cluster 152 denies access to the user device (e.g., respective one of user devices 106-1 through 106-m of FIG. 1). After operation 240, method 200 ends.

In response to determining at operation 246 that the time 184 is less than the authentication token lifetime 186, method 200 continues to operation 248, where the computing cluster 152 compares the URL 178 to the set of URLs (e.g., respective one of URLs 146-1 through 146-m of FIG. 1).

At operation 250, the computing cluster 152 determines if the URL 178 is one of the set of URLs (e.g., respective one of URLs 146-1 through 146-m of FIG. 1).

In response to determining at operation 250 that the URL 178 is not one of the set of URLs (e.g., respective one of URLs 146-1 through 146-m of FIG. 1), method 200 continues to operation 240, where the user device (e.g., respective one of user devices 106-1 through 106-m of FIG. 1) fails to access the UI (e.g., respective one of UIs 164-1 through 164-m of FIG. 1) using the browser application (e.g., respective one of browser applications 116-1 through 116-m of FIG. 1). In other words, in response to determining at operation 250 that the URL 178 is not one of the set of URLs (e.g., respective one of URLs 146-1 through 146-m of FIG. 1), the computing cluster 152 denies access to the user device (e.g., respective one of user devices 106-1 through 106-m of FIG. 1). After operation 240, method 200 ends.

In response to determining at operation 250 that the URL 178 is one of the set of URLs (e.g., respective one of URLs 146-1 through 146-m of FIG. 1), method 200 continues to operation 252, where the user device (e.g., respective one of user devices 106-1 through 106-m of FIG. 1) accesses the UI (e.g., respective one of UIs 164-1 through 164-m of FIG. 1) of the computing cluster 152 using the browser application (e.g., respective one of browser applications 116-1 through 116-m of FIG. 1). In other words, in response to determining at operation 250 that the URL 178 is one of the set of URLs (e.g., respective one of URLs 146-1 through 146-m of FIG. 1), the computing cluster 152 grants access to the user device (e.g., respective one of user devices 106-1 through 106-m of FIG. 1). After operation 252, method 200 ends.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
   an authentication token generator comprising:
   a first memory configured to store:
   a group associated with each user; and
   user credentials for each user; and
   a first processor communicatively coupled to the first memory, wherein the first processor is configured to:
   receive first user credentials of a first user from a first user device;
   compare the first user credentials to stored user credentials for the first user;
   in response to the first user credentials matching the stored user credentials for the first user, authenticate the first user;
   determine a first group of the first user based on the first user credentials;
   send the first group to a computing cluster;
   in response to sending the first group, receive first access information for the first user from the computing cluster, wherein the first access information comprises a first set of uniform resource locators (URLs) associated with the first group, and wherein each URL of the first set of URLs corresponds to a respective user interface (UI) of the computing cluster that is accessible to the first group;
   generate a first authentication token based on the first user credentials and the first access information;

send a first copy of the first authentication token to the first user device; and
send a second copy of the first authentication token to the computing cluster; and
the first user device communicatively coupled to the authentication token generator, wherein the first user device comprises:
a second memory configured to store a first browser application; and
a second processor communicatively coupled to the second memory, wherein the second processor is configured to:
receive the first copy of the first authentication token from the authentication token generator;
assign the first copy of the first authentication token to a first session variable of the first browser application;
input a first URL into the first browser application to attempt accessing a first UI of the computing cluster; and
send the first URL and the first session variable to the computing cluster; and
the computing cluster communicatively coupled to the first user device and the authentication token generator, wherein the computing cluster comprises:
a third memory configured to store respective access information for each user; and
a third processor communicatively coupled to the third memory, wherein the third processor is configured to:
receive the second copy of the first authentication token from the authentication token generator;
receive the first URL and the first session variable from the first user device;
compare the first session variable to the second copy of the first authentication token; and
in response to the first session variable matching the second copy of the first authentication token, compare the first URL to the first set of URLs, wherein the second processor is further configured to:
in response to the first URL being one of the first set of URLs and the first session variable matching the second copy of the first authentication token, access the first UI of the computing cluster using the first browser application.

2. The system of claim 1, wherein the second processor is further configured to:
in response to the first URL not being one of the first set of URLs, fail accessing the first UI using the first browser application.

3. The system of claim 1, wherein the second processor is further configured to:
in response to the first session variable not matching the second copy of the first authentication token, fail accessing the first UI using the first browser application.

4. The system of claim 1, wherein the first processor is further configured to:
receive second user credentials of a second user from a second user device;
compare the second user credentials to stored user credentials for the second user;
in response to the second user credentials matching the stored user credentials for the second user, authenticate the second user;
determine a second group of the second user based on the second user credentials, wherein the second group is different from the first group;
send the second group to the computing cluster;
in response to sending the second group, receive second access information for the second user from the computing cluster, wherein the second access information comprises a second set of URLs associated with the second group, wherein each URL of the second set of URLs corresponds to a respective UI of the computing cluster that is accessible to the second group, and wherein the second set of URLs is different from the first set of URLs;
generate a second authentication token based on the second user credentials and the second access information;
send a first copy of the second authentication token to the second user device; and
send a second copy of the second authentication token to the computing cluster.

5. The system of claim 4, further comprising:
the second user device communicatively coupled to the authentication token generator and the computing cluster, wherein the second user device comprises:
a fourth memory configured to store a second browser application; and
a fourth processor communicatively coupled to the fourth memory, wherein the fourth processor is configured to:
receive the first copy of the second authentication token from the authentication token generator;
assign the first copy of the second authentication token to a second session variable of the second browser application;
input a second URL into the second browser application to attempt accessing a second UI of the computing cluster; and
send the second URL and the second session variable to the computing cluster, wherein the third processor is further configured to:
receive the second copy of the first authentication token from the authentication token generator;
receive the second URL and the second session variable from the second user device;
compare the second session variable to the second copy of the second authentication token; and
in response to the second session variable matching the second copy of the second authentication token, compare the second URL to the second set of URLs, wherein the second processor is further configured to:
in response to the second URL being one of the second set of URLs and the second session variable matching the second copy of the second authentication token, access the second UI of the computing cluster using the second browser application, wherein the second UI is different from the first UI.

6. The system of claim 1, wherein the first processor is further configured to:
receive third user credentials of a third user from a third user device;
compare the third user credentials to stored user credentials for the third user;
in response to the third user credentials matching the stored user credentials for the third user, authenticate the third user;

determine a third group of the third user based on the third user credentials, wherein the third group is same as the first group;
send the third group to the computing cluster;
in response to sending the third group, receive third access information for the third user from the computing cluster, wherein the third access information comprises a third set of URLs associated with the third group, wherein each URL of the third set of URLs corresponds to a respective UI of the computing cluster that is accessible to the third group, and wherein the third set of URLs is same as the first set of URLs;
generate a third authentication token based on the third user credentials and the third access information;
send a first copy of the third authentication token to the third user device; and
send a second copy of the third authentication token to the computing cluster.

7. The system of claim 6, further comprising:
the third user device communicatively coupled to the authentication token generator and the computing cluster, wherein the third user device comprises:
a fifth memory configured to store a third browser application; and
a fifth processor communicatively coupled to the fifth memory, wherein the fifth processor is configured to:
receive the first copy of the third authentication token from the authentication token generator;
assign the first copy of the third authentication token to a third session variable of the third browser application;
input a third URL into the third browser application to attempt accessing a third UI of the computing cluster; and
send the third URL and the third session variable to the computing cluster, wherein the third processor is further configured to:
receive the second copy of the third authentication token from the authentication token generator;
receive the third URL and the third session variable from the third user device;
compare the third session variable to the second copy of the third authentication token; and
in response to the third session variable matching the second copy of the third authentication token, compare the third URL to the third set of URLs, wherein the second processor is further configured to:
in response to the third URL being one of the third set of URLs and the third session variable matching the second copy of the third authentication token, access the third UI of the computing cluster using the third browser application, wherein the third UI is different from the first UI.

8. A method comprising:
receiving first user credentials of a first user from a first user device;
comparing the first user credentials to stored user credentials for the first user;
in response to the first user credentials matching the stored user credentials for the first user, authenticating the first user;
determining a first group of the first user based on the first user credentials;
sending the first group to a computing cluster;
in response to sending the first group, receiving first access information for the first user from the computing cluster, wherein the first access information comprises a first set of uniform resource locators (URLs) associated with the first group, and wherein each URL of the first set of URLs corresponds to a respective user interface (UI) of the computing cluster that is accessible to the first group;
generating a first authentication token based on the first user credentials and the first access information;
sending a first copy of the first authentication token to the first user device;
sending a second copy of the first authentication token to the computing cluster;
assigning the first copy of the first authentication token to a first session variable of a first browser application of the first user device;
inputting a first URL into the first browser application to attempt accessing a first UI of the computing cluster;
sending the first URL and the first session variable to the computing cluster;
comparing the first session variable to the second copy of the first authentication token;
in response to the first session variable matching the second copy of the first authentication token, comparing the first URL to the first set of URLs; and
in response to the first URL being one of the first set of URLs and the first session variable matching the second copy of the first authentication token, accessing the first UI of the computing cluster using the first browser application.

9. The method of claim 8, further comprising:
in response to the first URL not being one of the first set of URLs, failing accessing the first UI using the first browser application.

10. The method of claim 8, further comprising:
in response to the first session variable not matching the second copy of the first authentication token, failing accessing the first UI using the first browser application.

11. The method of claim 8, further comprising:
receiving second user credentials of a second user from a second user device;
comparing the second user credentials to stored user credentials for the second user;
in response to the second user credentials matching the stored user credentials for the second user, authenticating the second user;
determining a second group of the second user based on the second user credentials, wherein the second group is different from the first group;
sending the second group to the computing cluster;
in response to sending the second group, receiving second access information for the second user from the computing cluster, wherein the second access information comprises a second set of URLs associated with the second group, wherein each URL of the second set of URLs corresponds to a respective UI of the computing cluster that is accessible to the second group, and wherein the second set of URLs is different from the first set of URLs;
generating a second authentication token based on the second user credentials and the second access information;
sending a first copy of the second authentication token to the second user device; and sending a second copy of the second authentication token to the computing cluster.

12. The method of claim 11, further comprising:
assigning the first copy of the second authentication token to a second session variable of a second browser application of the second user device;
inputting a second URL into the second browser application to attempt accessing a second UI of the computing cluster;
sending the second URL and the second session variable to the computing cluster;
comparing the second session variable to the second copy of the second authentication token;
in response to the second session variable matching the second copy of the second authentication token, comparing the second URL to the second set of URLs; and
in response to the second URL being one of the second set of URLs and the second session variable matching the second copy of the second authentication token, accessing the second UI of the computing cluster using the second browser application, wherein the second UI is different from the first UI.

13. The method of claim 8, further comprising:
receiving third user credentials of a third user from a third user device;
comparing the third user credentials to stored user credentials for the third user;
in response to the third user credentials matching the stored user credentials for the third user, authenticating the third user;
determining a third group of the third user based on the third user credentials, wherein the third group is same as the first group;
sending the third group to the computing cluster;
in response to sending the third group, receiving third access information for the third user from the computing cluster, wherein the third access information comprises a third set of URLs associated with the third group, wherein each URL of the third set of URLs corresponds to a respective UI of the computing cluster that is accessible to the third group, and wherein the third set of URLs is same as the first set of URLs;
generating a third authentication token based on the third user credentials and the third access information;
sending a first copy of the third authentication token to the third user device; and
sending a second copy of the third authentication token to the computing cluster.

14. The method of claim 13, further comprising:
assigning the first copy of the third authentication token to a third session variable of a third browser application of the third user device;
inputting a third URL into the third browser application to attempt accessing a third UI of the computing cluster;
sending the third URL and the third session variable to the computing cluster;
comparing the third session variable to the second copy of the third authentication token;
in response to the third session variable matching the second copy of the third authentication token, comparing the third URL to the third set of URLs;
in response to the third URL being one of the third set of URLs and the third session variable matching the second copy of the third authentication token, accessing the third UI of the computing cluster using the third browser application, wherein the third UI is different from the first UI.

15. A non-transitory computer-readable medium storing instructions that, when executed by one or more processors, cause the one or more processors to:
receive first user credentials of a first user from a first user device;
compare the first user credentials to stored user credentials for the first user;
in response to the first user credentials matching the stored user credentials for the first user, authenticate the first user;
determine a first group of the first user based on the first user credentials;
send the first group to a computing cluster;
in response to sending the first group, receive first access information for the first user from the computing cluster, wherein the first access information comprises a first set of uniform resource locators (URLs) associated with the first group, and wherein each URL of the first set of URLs corresponds to a respective user interface (UI) of the computing cluster that is accessible to the first group;
generate a first authentication token based on the first user credentials and the first access information;
send a first copy of the first authentication token to the first user device;
send a second copy of the first authentication token to the computing cluster;
assign the first copy of the first authentication token to a first session variable of a first browser application of the first user device;
input a first URL into the first browser application to attempt accessing a first UI of the computing cluster;
send the first URL and the first session variable to the computing cluster;
compare the first session variable to the second copy of the first authentication token;
in response to the first session variable matching the second copy of the first authentication token, compare the first URL to the first set of URLs; and
in response to the first URL being one of the first set of URLs and the first session variable matching the second copy of the first authentication token, access the first UI of the computing cluster using the first browser application.

16. The non-transitory computer-readable medium of claim 15, wherein the instructions, when executed by the one or more processors, further cause the one or more processors to:
in response to the first URL not being one of the first set of URLs, fail accessing the first UI using the first browser application.

17. The non-transitory computer-readable medium of claim 15, wherein the instructions, when executed by the one or more processors, further cause the one or more processors to:
receive second user credentials of a second user from a second user device;
compare the second user credentials to stored user credentials for the second user;
in response to the second user credentials matching the stored user credentials for the second user, authenticate the second user;
determine a second group of the second user based on the second user credentials, wherein the second group is different from the first group;
send the second group to the computing cluster;

in response to sending the second group, receive second access information for the second user from the computing cluster, wherein the second access information comprises a second set of URLs associated with the second group, wherein each URL of the second set of URLs corresponds to a respective UI of the computing cluster that is accessible to the second group, and wherein the second set of URLs is different from the first set of URLs;

generate a second authentication token based on the second user credentials and the second access information;

send a first copy of the second authentication token to the second user device; and send a second copy of the second authentication token to the computing cluster.

18. The non-transitory computer-readable medium of claim 17, wherein the instructions, when executed by the one or more processors, further cause the one or more processors to:

assign the first copy of the second authentication token to a second session variable of a second browser application of the second user device;

input a second URL into the second browser application to attempt accessing a second UI of the computing cluster;

send the second URL and the second session variable to the computing cluster;

compare the second session variable to the second copy of the second authentication token;

in response to the second session variable matching the second copy of the second authentication token, compare the second URL to the second set of URLs; and in response to the second URL being one of the second set of URLs and the second session variable matching the second copy of the second authentication token, access the second UI of the computing cluster using the second browser application, wherein the second UI is different from the first UI.

19. The non-transitory computer-readable medium of claim 15, wherein the instructions, when executed by the one or more processors, further cause the one or more processors to:

receive third user credentials of a third user from a third user device;

compare the third user credentials to stored user credentials for the third user;

in response to the third user credentials matching the stored user credentials for the third user, authenticate the third user;

determine a third group of the third user based on the third user credentials, wherein the third group is same as the first group;

send the third group to the computing cluster;

in response to sending the third group, receive third access information for the third user from the computing cluster, wherein the third access information comprises a third set of URLs associated with the third group, wherein each URL of the third set of URLs corresponds to a respective UI of the computing cluster that is accessible to the third group, and wherein the third set of URLs is same as the first set of URLs;

generate a third authentication token based on the third user credentials and the third access information;

send a first copy of the third authentication token to the third user device; and send a second copy of the third authentication token to the computing cluster.

20. The non-transitory computer-readable medium of claim 19, wherein the instructions, when executed by the one or more processors, further cause the one or more processors to:

assign the first copy of the third authentication token to a third session variable of a third browser application of the third user device;

input a third URL into the third browser application to attempt accessing a third UI of the computing cluster;

send the third URL and the third session variable to the computing cluster;

compare the third session variable to the second copy of the third authentication token;

in response to the third session variable matching the second copy of the third authentication token, compare the third URL to the third set of URLs;

in response to the third URL being one of the third set of URLs and the third session variable matching the second copy of the third authentication token, access the third UI of the computing cluster using the third browser application, wherein the third UI is different from the first UI.

* * * * *